(12) United States Patent
Graham et al.

(10) Patent No.: US 7,347,628 B2
(45) Date of Patent: Mar. 25, 2008

(54) OPTICAL INTERFACE IDENTIFICATION SYSTEM

(75) Inventors: Richard W. Graham, Derry, NH (US); John J. Roese, Newmarket, NH (US)

(73) Assignee: Enterasys Networks, Inc., Andover, MA (US)

( * ) Notice: Subject to any disclaimer, the term of this patent is extended or adjusted under 35 U.S.C. 154(b) by 95 days.

(21) Appl. No.: 11/269,152

(22) Filed: Nov. 8, 2005

(65) Prior Publication Data

US 2006/0120671 A1 Jun. 8, 2006

Related U.S. Application Data

(60) Provisional application No. 60/626,002, filed on Nov. 8, 2004.

(51) Int. Cl.
*G02B 6/36* (2006.01)
(52) U.S. Cl. .............................. 385/75; 385/88; 385/89
(58) Field of Classification Search .................. 385/75, 385/88–89
See application file for complete search history.

(56) References Cited

U.S. PATENT DOCUMENTS

| 5,076,688 A | * | 12/1991 | Bowen et al. | ............. 356/73.1 |
| 5,475,781 A | * | 12/1995 | Chang et al. | ................. 385/76 |
| 2005/0199792 A1 | * | 9/2005 | Argast et al. | ............... 250/239 |

OTHER PUBLICATIONS

Smartronix Catalog.*

* cited by examiner

*Primary Examiner*—Michelle R. Connelly-Cushua
*Assistant Examiner*—Eric Wong
(74) *Attorney, Agent, or Firm*—Holland & Knight LLP; Brian J Colandreo, Esq.

(57) ABSTRACT

A connector assembly, configured to releasably couple a socket assembly, includes zero or more data conductors. An optical pathway is configured to: receive an optical signal from an optical light source positioned within the socket assembly; and provide at least a portion of the optical signal to an optical light target positioned within the socket assembly.

24 Claims, 8 Drawing Sheets

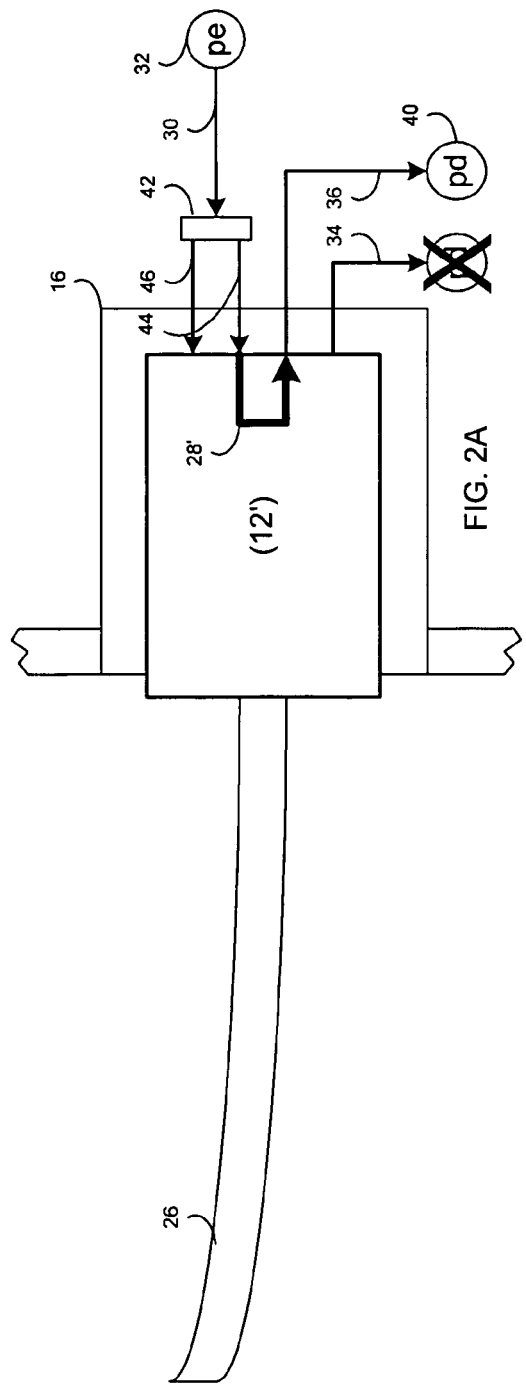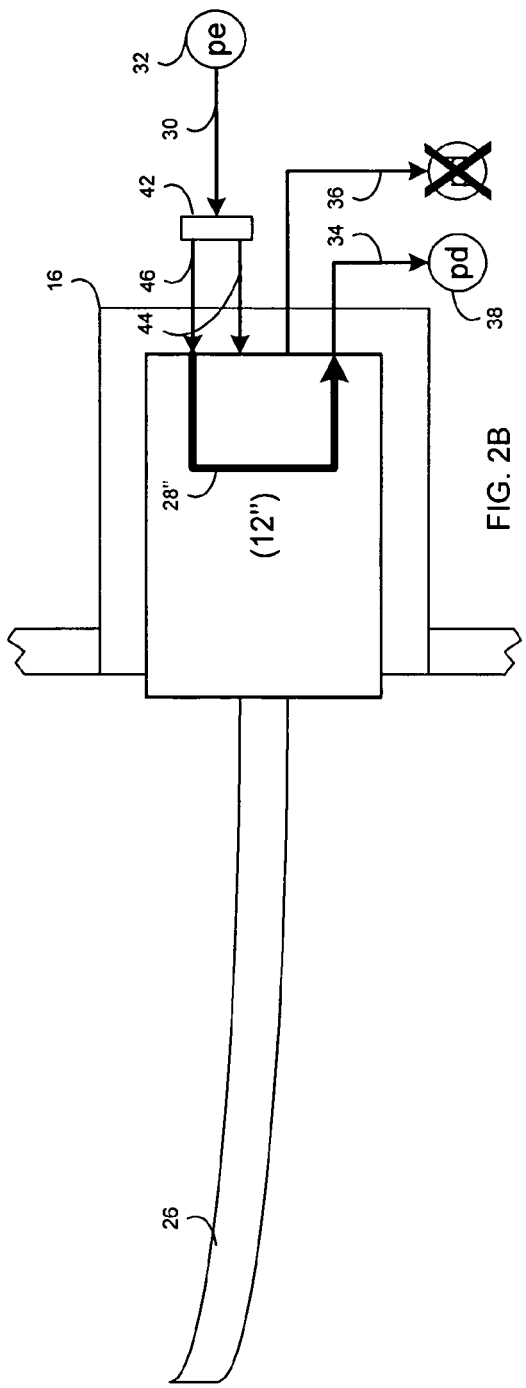

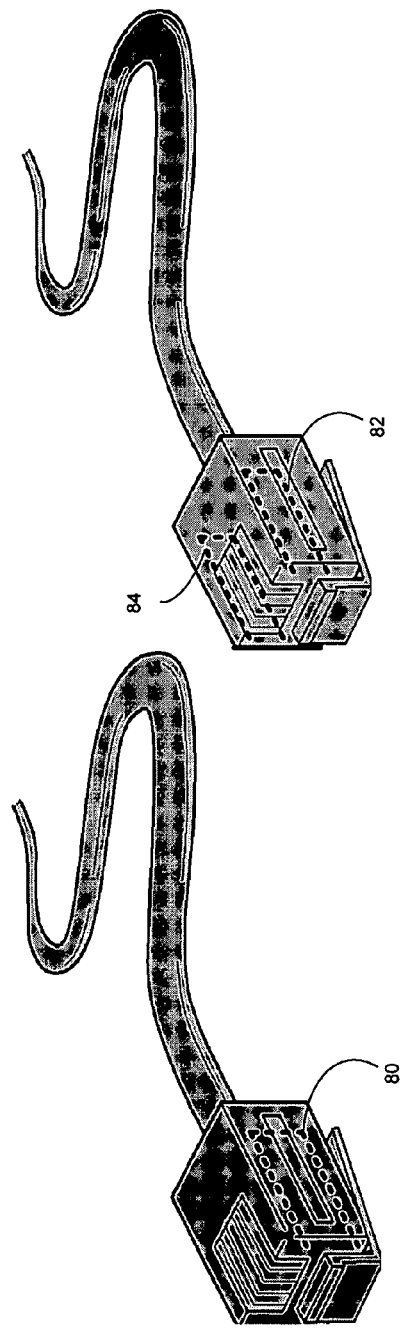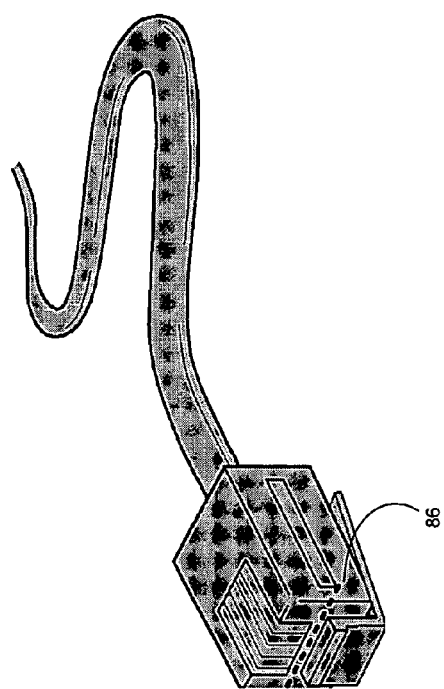
FIG. 3A
FIG. 3B
FIG. 3C

OPTICAL INTERFACE IDENTIFICATION SYSTEM

RELATED APPLICATIONS

This application claims the priority of the following application, which is herein incorporated by reference: U.S. Provisional Application Ser. No. 60/626,002 entitled, "Optical Detection of Plug Type and Insertion Status", filed Nov. 2004.

This application herein incorporates by reference the following applications: U.S. patent application Ser. No. 10/737,652, entitled "Modular Receptacle and Interface with Integral Optical Indication", filed 17 Dec. 2003; and U.S. patent application Ser. No. 10/858,416, entitled "visual Optical Indicators for Plug Assemblies, Connectors and Cables", filed 01 Jun. 2004. Both applications are assigned to common assignee Enterasys Networks, Inc.

FIELD OF THE DISCLOSURE

This disclosure relates to cabling systems and, more particularly, to smart cabling systems that identify various cable connections and interface types.

BACKGROUND

Socket assemblies have routinely been provided with optical indicators for status indication. The indicators have typically consisted of LEDs (Light Emitting Diodes) or light pipe viewing surfaces located on the assembly face plane adjacent the individual socket assemblies. These indicators are then selectively illuminated to provide visual information relating to the particular socket assembly.

One approach to provide a visual display of information integrated into the connector itself is disclosed in the above referenced and commonly assigned U.S. patent application Ser. No. 10/737,652. This approach utilizes light pipes to selectively illuminate the interior of a socket assembly, which in turn, illuminates a conventional transparent plug assembly inserted therein.

In addition, U.S. patent application Ser. No. 10/858,416, details approaches and methods to aid in the display of information on the inserted plug interfaces, both on the local and remote end of the cabling assemblies.

However, as is understood in interconnect systems, there may be many uses defined for a given connector system. Plugs are often standardized for a given use, but may migrate over time to support multiple revisions of a particular interface or other uses. The IEEE 802.3 has several popular connector types such as the 8 pin Modular Jack (MJ-8) that is used for Ethernet. This connector has a long history and has been used at speeds of 1, 10, 100, 1000, 10,000 Megabits per second. At some speeds all eight pins are used, at other speeds only half the pins are used. In a new standard IEEE 802.3af, a small amount of power may optionally be added to a specific pair set or as an alternate option it may be sent down the other pair set. In addition, the IEEE standards define several cabling types such as "straight through" connections or alternately "crossover" connections of the cable for connecting various devices with MJ-8 Ethernet receptacles together. Making matters worse, the standard interface for many telecoms (phone systems) for businesses also uses the exact same eight pin connector plug and socket assembly.

As connectors increase in popularity they decease in cost and that low cost invites other different and often disparate uses. In some cases, the uses may be not only incompatible, but incorrect connections may harm the electrical interfaces and attached devices.

SUMMARY OF THE DISCLOSURE

According to an aspect of this disclosure, a connector assembly, configured to releasably couple a socket assembly, includes zero or more data conductors. An optical pathway is configured to: receive an optical signal from an optical light source positioned within the socket assembly; and provide at least a portion of the optical signal to an optical light target positioned within the socket assembly.

One or more of the following features may also be included. The optical light source may be a photo emitter. The optical light target may be a photo detector. The optical light target may be an optical conductor that is optically-coupled to a photo detector. At least one of the zero or more data conductors may be an electrical data conductor. At least one of the zero or more data conductors may be an optical data conductor.

The optical signal may include optical energy within a defined optical spectrum. The optical pathway may include an optical filter for filtering a portion of the defined optical spectrum.

The connector assembly may include one or more additional optical pathways. Each additional optical pathway may be configured to: receive the optical signal from the optical light source positioned within the socket assembly; and provide at least a portion of the optical signal to a unique optical light target positioned within the socket assembly. The optical pathway may include at least one fiber-optic conductor. The optical pathway may include at least one optical reflector.

The connector assembly may include an optical indicator assembly. The optical pathway may be further configured to provide at least a portion of the optical signal to the optical indicator assembly. The optical indicator assembly may be configured to provide a visual indicator concerning a characteristic of the coupling of the socket assembly and the connector assembly in response to receiving the at least a portion of the optical signal.

According to another aspect of this disclosure, a cable assembly includes a conductor assembly including zero or more data conductors. A first connector assembly is affixed to a first distal end of the conductor assembly and is configured to releasably couple a first socket assembly. A second connector assembly is affixed to a second distal end of the conductor assembly and is configured to releasably couple a second socket assembly. A first optical pathway is configured to: receive a first optical signal from a first optical light source positioned within the first socket assembly; and provide at least a portion of the first optical signal to a first optical light target positioned within the first socket assembly.

One or more of the following features may also be included. The first optical pathway may include a first optical conductor positioned within the conductor assembly and configured to provide at least a portion of the first optical signal from the first connector assembly to the second connector assembly. The first optical pathway may include a second optical conductor positioned within the conductor assembly and configured to provide at least a portion of the first optical signal, provided by the first optical conductor to the second connector assembly, from the second connector assembly to the first connector assembly.

The cable assembly may include a second optical pathway configured to: receive a second optical signal from a second optical light source positioned within the second socket assembly; and provide at least a portion of the second optical signal to a second optical light target positioned within the second socket assembly. The first optical light source may be a photo emitter. The first optical light target may be a photo detector. The first optical light target may be an optical conductor, which is optically-coupled to a photo detector.

The first optical signal may include optical energy within a defined optical spectrum. The first optical pathway may include an optical filter for filtering a portion of the defined optical spectrum. The first optical pathway may include at least one fiber-optic conductor. The first optical pathway may include at least one optical reflector.

The cable assembly may include an optical indicator assembly. The first optical pathway may be further configured to provide at least a portion of the first optical signal to the optical indicator assembly. The optical indicator assembly may be incorporated into the first connector assembly and may be configured to provide a visual indicator concerning a characteristic of the coupling of the first socket assembly and the first connector assembly in response to receiving the at least a portion of the first optical signal. The optical indicator assembly may be incorporated into the second connector assembly and may be configured to provide a visual indicator concerning a characteristic of the coupling of the second socket assembly and the second connector assembly in response to receiving the at least a portion of the first optical signal.

The details of one or more implementations are set forth in the accompanying drawings and the description below. Other features and advantages will become apparent from the description, the drawings, and the claims.

BRIEF DESCRIPTION OF THE DRAWINGS

FIGS. 2a & 2b are diagrammatic views of various embodiments of the optical interface identification system of FIG. 1;

FIGS. 3A, 3B & 3C are diagrammatic views of other embodiments of the optical interface identification system of FIG. 1;

DETAILED DESCRIPTION OF THE PREFERRED EMBODIMENTS

Figure 1:
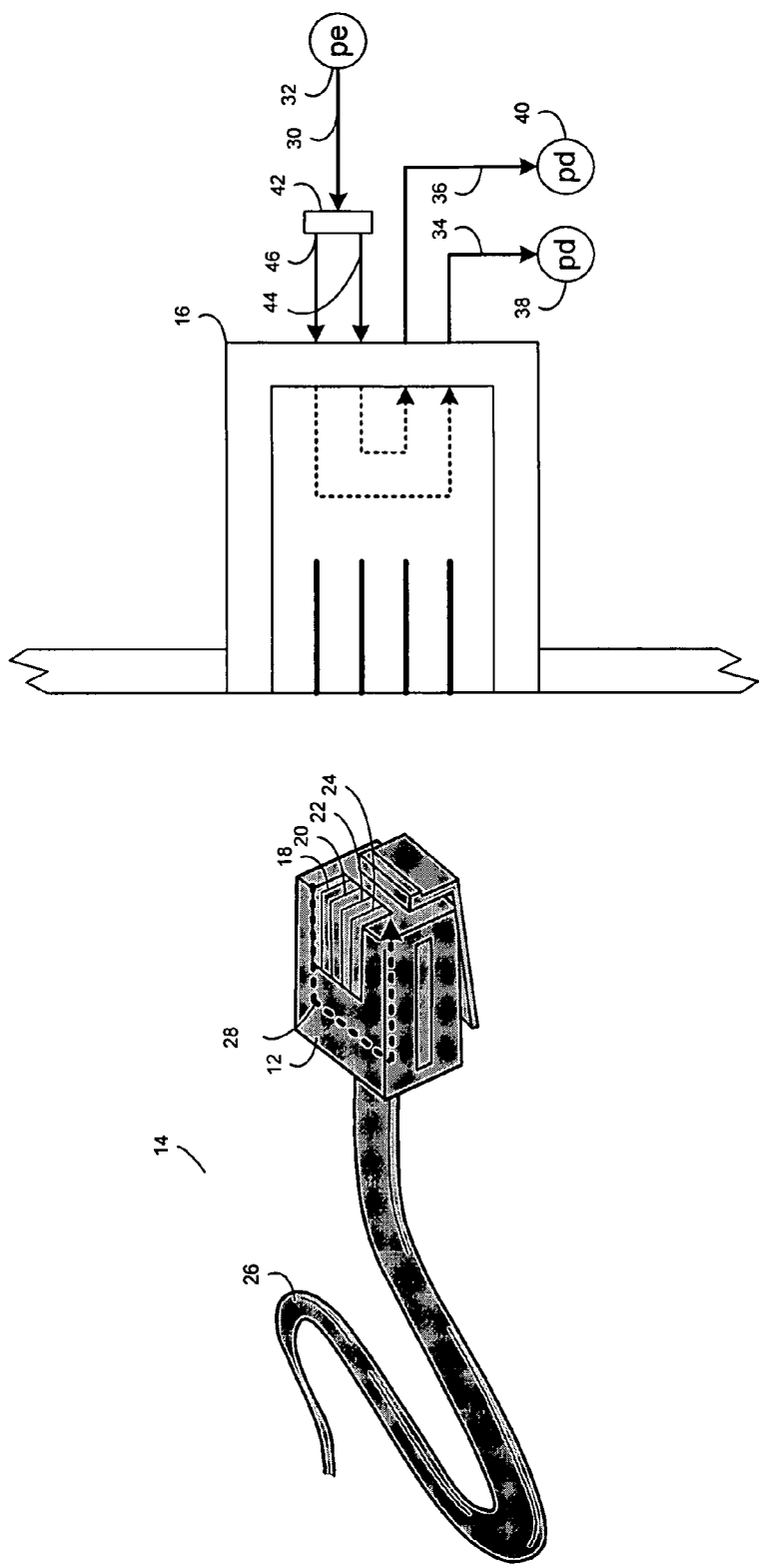
FIG. 1 is a diagrammatic view of a cable assembly including an optical interface identification system and a socket assembly.

Referring to FIG. 1, there is shown an optical interface identification system 10 that may be incorporated into connector assembly 12 of cable assembly 14. Connector assembly 12 may be configured to releasably couple socket assembly 16, thus allowing for connector assembly 12 to be quickly connected to and removed from socket assembly 16.

Examples of connector assembly 12 may includes RJ11 assemblies, RJ45 assemblies, Centronics printer assemblies, DB9 assemblies, and DB25 assemblies. Examples of cable assembly 14 may include telephone cables, network cables, printer cables, serial data cables, and USB (i.e., universal serial bus) cables. Socket assembly 16 may be incorporated into: modems, network interface cards, I/O cards, printing devices, and scanning devices, for example.

Connector assembly 12 may include one or more conductors 18, 20, 22,24 that are typically coupled to one or more conductors (not shown) within conductor assembly 26. An example of conductor assembly 26 includes a multi-conductor wire bundle. Conductors 18, 20, 22, 24 may be electrical conductors or optical conductors. An example of electrical conductors includes copper pins (e.g., conductors 18, 20, 22, 24) within connector assembly 12, which are electrically coupled to copper wires (not shown) within conductor assembly 26. An example of optical conductors includes optical couplings (not shown) within connector assembly 12, which are optically coupled to fiber-optic conductors (not shown) within conductor assembly 26.

As will be discussed below in greater detail, connector assembly 12 may include one or more optical pathways (e.g., optical pathway 28), which are configured to: receive an optical signal 30 from an optical light source (e.g., a photo emitter) 32 positioned within socket assembly 16; and provide at least a portion 34, 36 of optical signal 30 to an optical light target (e.g., a photo detector) 38, 40 (respectively) positioned within socket assembly 16.

Optical signal 30 may be split (using optical signal splitter 42) into a plurality of optical signals (e.g., optical signals 44, 46), each of which is provided to socket assembly 16. Photo emitter 32, photo detectors 38, 40, and/or optical signal splitter 42 may be physically located within socket assembly 16 and proximate e.g., optical pathway 28.(included within connector assembly 12) once connector assembly 12 is inserted into socket assembly 16. Alternatively, photo emitter 32, photo detectors 38, 40, and/or optical signal splitter 42 may be physically located external to socket assembly 16 and one or more optical conductors (e.g., fiber optic conductors or light pipes, for example; not shown), optically coupled to e.g., photo emitter 32 and/or photo detectors 38, 40, may be used to provide optical signals 30, 44, 46 to socket assembly 116 and receive optical signals 34, 36 from socket assembly 16.

Socket assembly 16 may be capable of releasably engaging connector assembly 12, and connector assembly 12 may include one of a plurality of possible optical pathways. Referring also to FIGS. 2A & 2B, there is shown two embodiments 12', 12" of connector assembly 12, each of which include a uniquely-positioned optical pathway. For example, connector assembly 12' is shown to include optical pathway 28' and connector assembly 12" is shown to include optical pathway 28".

When connector assembly 12' is releasably coupled to socket assembly 16, optical signal 44 is routed to photo detector 40 (in the form of optical signal 36). Further, optical signal 46 is blocked (i.e., attenuated) by connector assembly 12'.

When connector assembly 12" is releasably coupled to socket assembly 16, optical signal 46 is routed to photo detector 38 (in the form of optical signal 34). Further, optical signal 44 is blocked (i.e., attenuated) by connector assembly 12'.

The output signals of photo detectors 38, 40 maybe provided as input signals to circuitry and/or software (not shown) that allows for the determination of a connection type and/or a connection characteristic. Examples of connection characteristics include: the status of the connection (e.g., connected, disconnected, or partially connected); number of conductors; potential of signals; encoding type; scrambling type; encryption type; optical wavelength; power; signal configuration; signal power; signal-to-noise ratio; and optical signal strength, for example). For example and as discussed above, a standard RJ45 connector assembly may be used for both computer wiring and telephone wiring. Accordingly, when e.g., connecting computer and phone equipment within a new office space, several cable assemblies (each terminating in RJ45 connector assemblies) may be present in the room and in need of being connected to either the phone system or the computer system. By using two different types of RJ45 connectors assemblies, namely one type of connector assembly (e.g., connector assembly 12') for use with telephone systems and another type of connector assembly (e.g., connector assembly 12") for use with computer systems, the wiring process is simplified. For example, if all telephone wiring includes connector assembly 12' and all computer wiring includes connector assembly 12", upon inserting the connector assembly into socket 16, the connector assembly type may be determined.

For example, when connecting the telephone wiring to the telephone, connector assembly 12' is expected to be inserted into socket assembly 16. Therefore, photo detector 40 should receive optical signal 36. Accordingly, photo detector 40 should provide an output signal to the circuitry and/or software (not shown), which provides an indication to the person wiring the telephone that the telephone is wired properly. This indication may be in the form of an LED (i.e., light emitting diode) signal or an on-screen indicator, for example. In the event that photo detector 40 does not detect optical signal 36 and/or optical signal 34 is detected by photodetector 38, an indication may be provided to the person wiring the telephone that the telephone is not wired properly. This indication may also be in the form of an LED (i.e., light emitting diode) signal, an on-screen indicator, or a log file stored within internal memory, for example.

Accordingly, through the use of connector assemblies that include unique optical pathways (e.g., optical pathway 28' versus optical pathway 28"), the integrity and accuracy of a wiring connection may be determined.

Referring also to FIGS. 3A, 3B & 3C, the optical pathways within a connector assembly may be configured in various ways. For example, while optical pathways 28', 28" are shown to span from one side of the connector assembly to another side of the connector assembly, other configurations are possible. For example, connector assemblies may be constructed in which an optical pathway 80 spans from an upper surface of the connector assembly to a lower surface of the connector assembly. Additionally, connector assemblies may be constructed that include a plurality of optical pathways (e.g., optical pathways 82, 84). When a connector assembly includes a plurality of optical pathways, each pathway may be provided with an optical signal from a common photo emitter or may be provided with unique optical signals from a plurality of photo emitters. Further, a connector assembly may be constructed in which an optical pathway 86 spans between a left face and right face of the connector assembly.

Figure 4B:
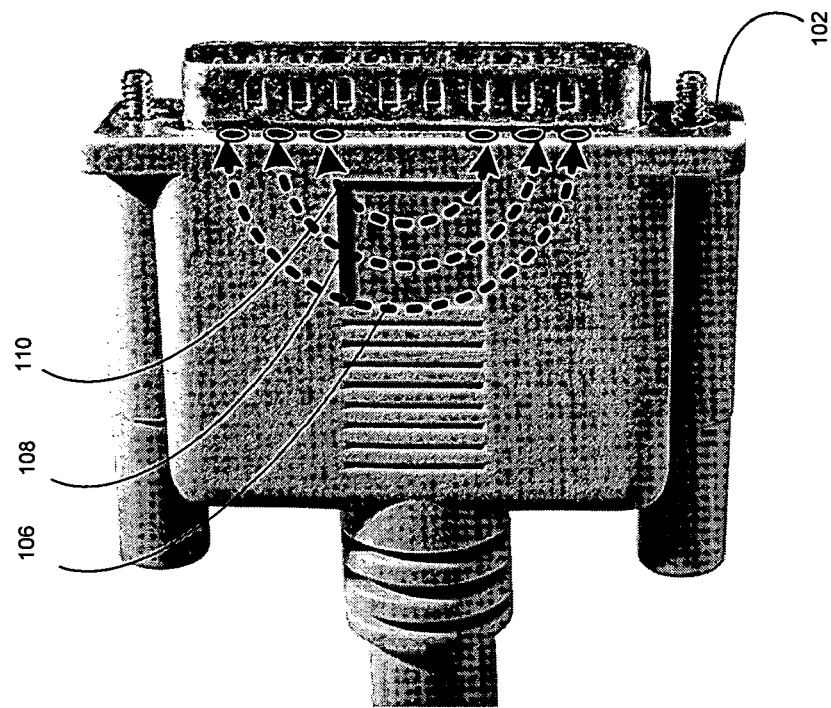
FIGS. 4A & 4B are diagrammatic views of other embodiments of the optical interface identification system of FIG. 1.
Figure 4A:
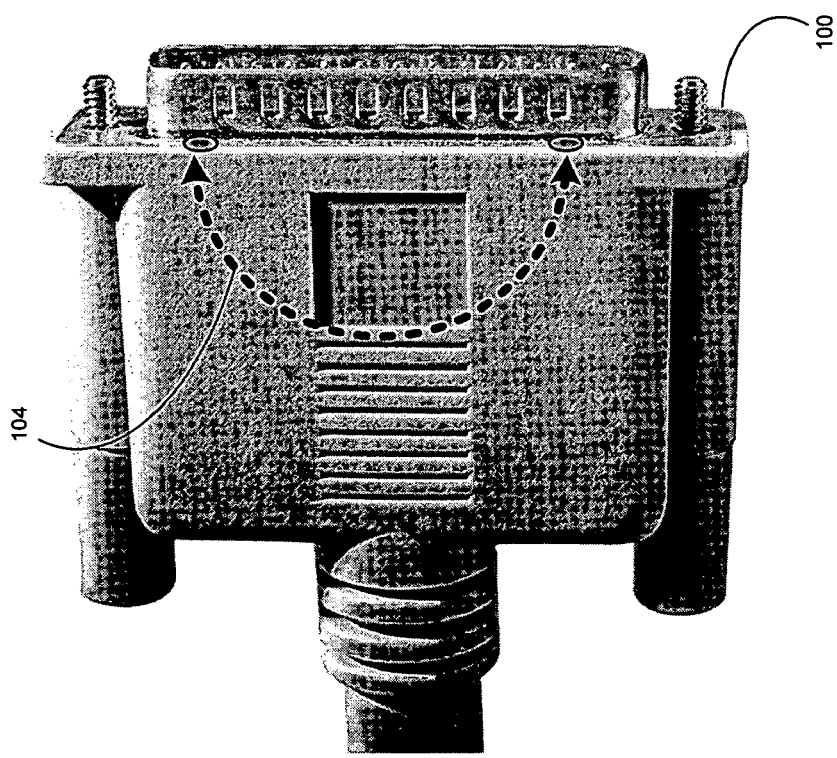

While the above-described system is shown to be implemented in an RJ11/RJ45 type connector assembly, other configurations are possible. For example and referring also to FIGS. 4A & 4B, optical pathways may be incorporated into other types of connector assemblies, such as DB25 connector assemblies 100, 102, which may include a single optical pathway 104 (included within connector assembly 100) or a plurality of optical pathways 106, 108, 110 (included within connector assembly 102).

The above-described optical pathways (e.g., optical pathways 28, 28', 28", 104, 106, 108, 110) may be implemented in various ways. For example, an optical pathway may be constructed using an optical fiber or an optical fiber bundle. Alternatively, a light pipe assembly may be used.

Figure 5B:
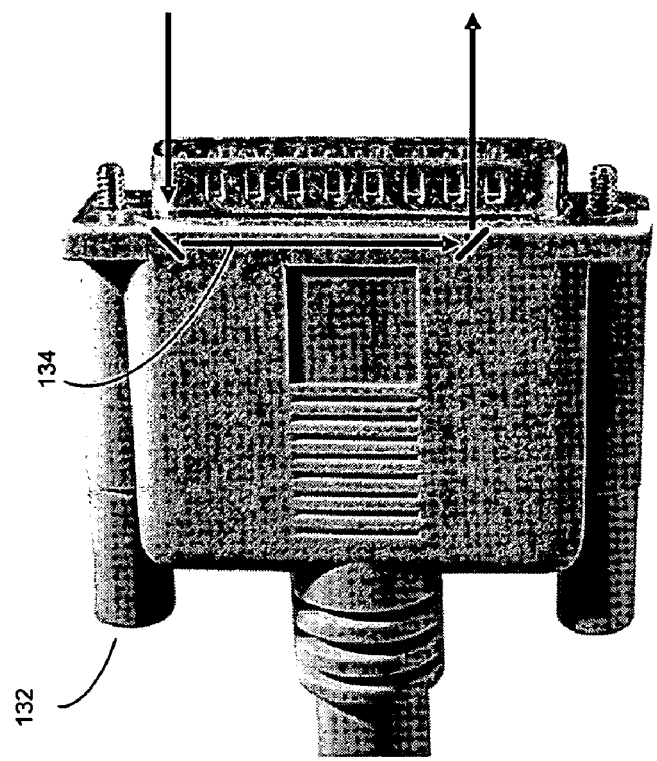
FIGS. 5A & 5B are diagrammatic views of other embodiments of the optical interface identification system of FIG. 1.
Figure 5A:
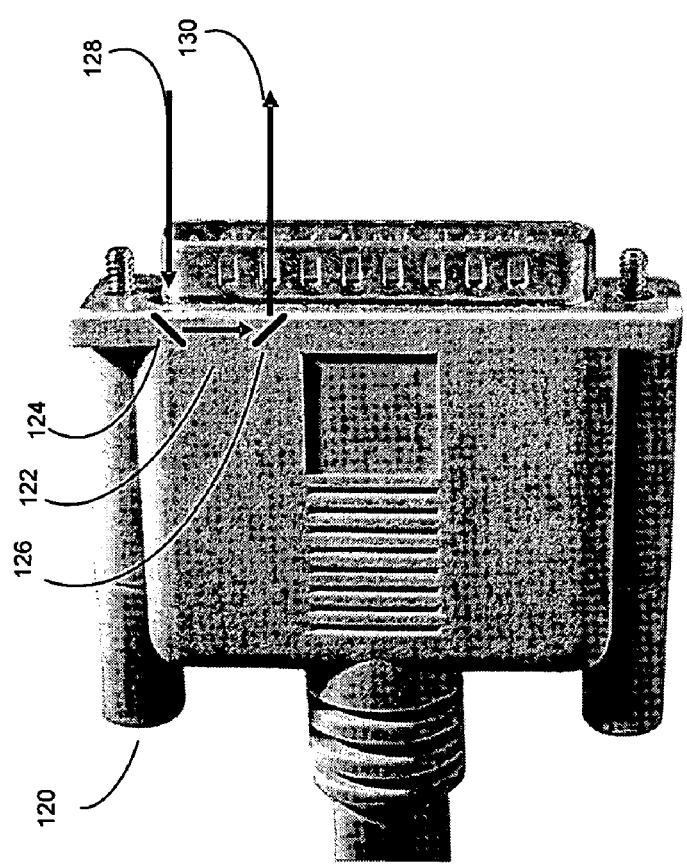

Referring also to FIGS. 5A & 5B, a reflective optical pathway is illustrated. For example, connector assembly 120 may include reflective optical pathway 122, which includes one or more reflective elements (e.g., mirrors) 124, 126 positioned to receive optical signal 128 and reflect back at least a portion of that optical signal (in the form of reflected optical signal 130). Connector assembly 132 is shown to include an alternatively-positioned reflective optical pathway 134. Additionally, optical pathways may be formed by combining reflective elements (e.g., elements 124, 126) and the above-described optical fibers/light pipes. Additional, one or more refractive devices (e.g., a prism or a lens) may be used to refract the optical signals.

Figure 6:
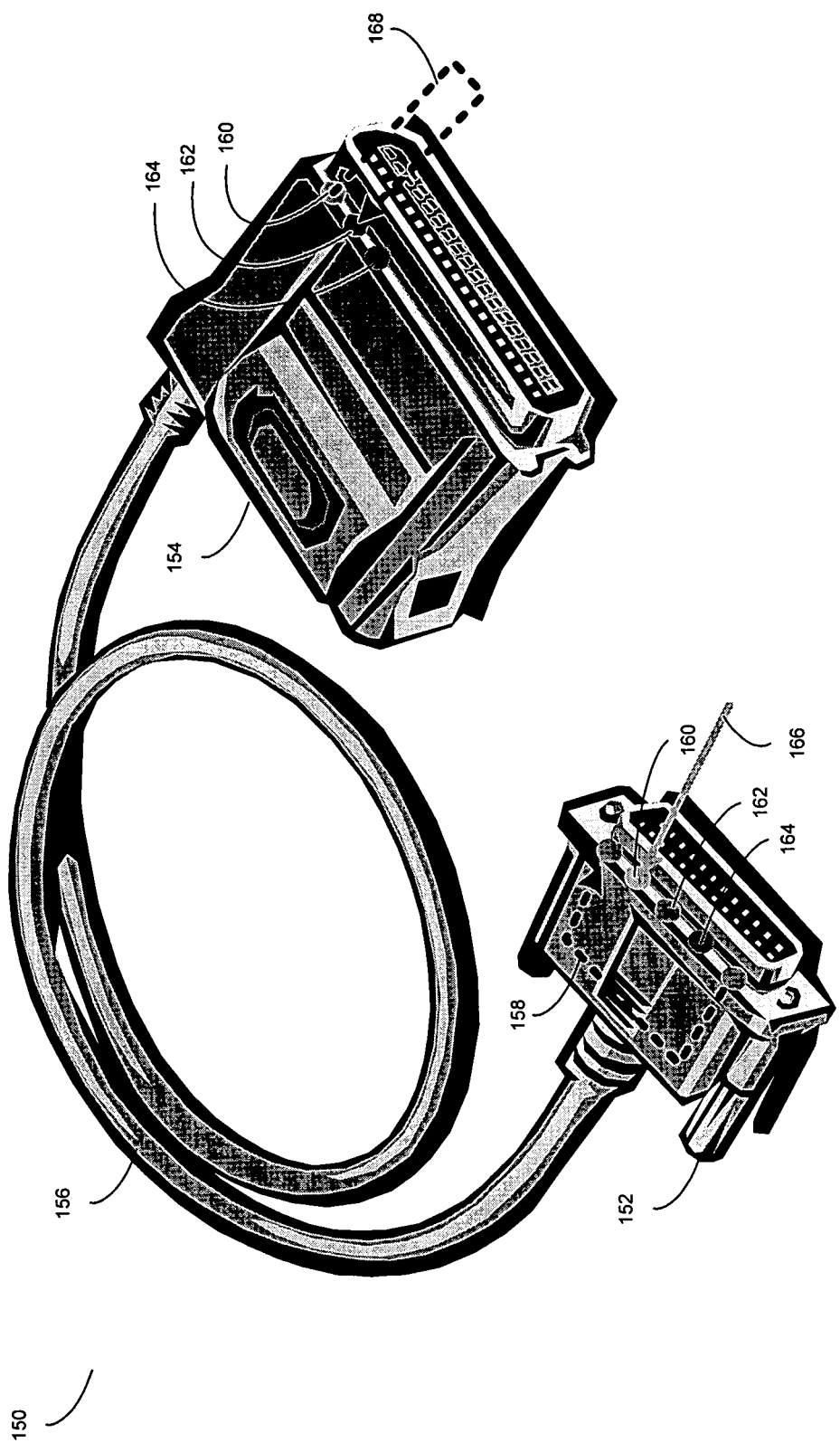
FIG. 6 is a diagrammatic view of a cable assembly including the optical interface identification system of FIG. 1.

Referring also to FIG. 6, there is shown a cable assembly 150 that includes a pair of connector assemblies 152, 154 and a conductor assembly 156. As discussed above, optical pathway 158 may provide an indication (to a user) concerning the connection type and/or connection characteristic of connector assembly 152. Additionally, optical conductors 160, 162, 164 may span from connector assembly 152, through conductor assembly 156 to connector assembly 154. When connector assembly 154 is releasably coupled to a socket assembly (not shown), though the use of optical pathways (not shown) within the socket assembly (not shown), a optical signal 166 present within e.g., optical conductor 160 may be provided to e.g., optical conductor 162 (via optical pathway 168) and routed back to the socket assembly (not shown) to which connector assembly 152 is releasably coupled. As with optical pathway 158, optical pathway 168 may provide an indication (to a user) concerning the connection type and/or connection characteristic of connector assembly 154.

Figure 7:
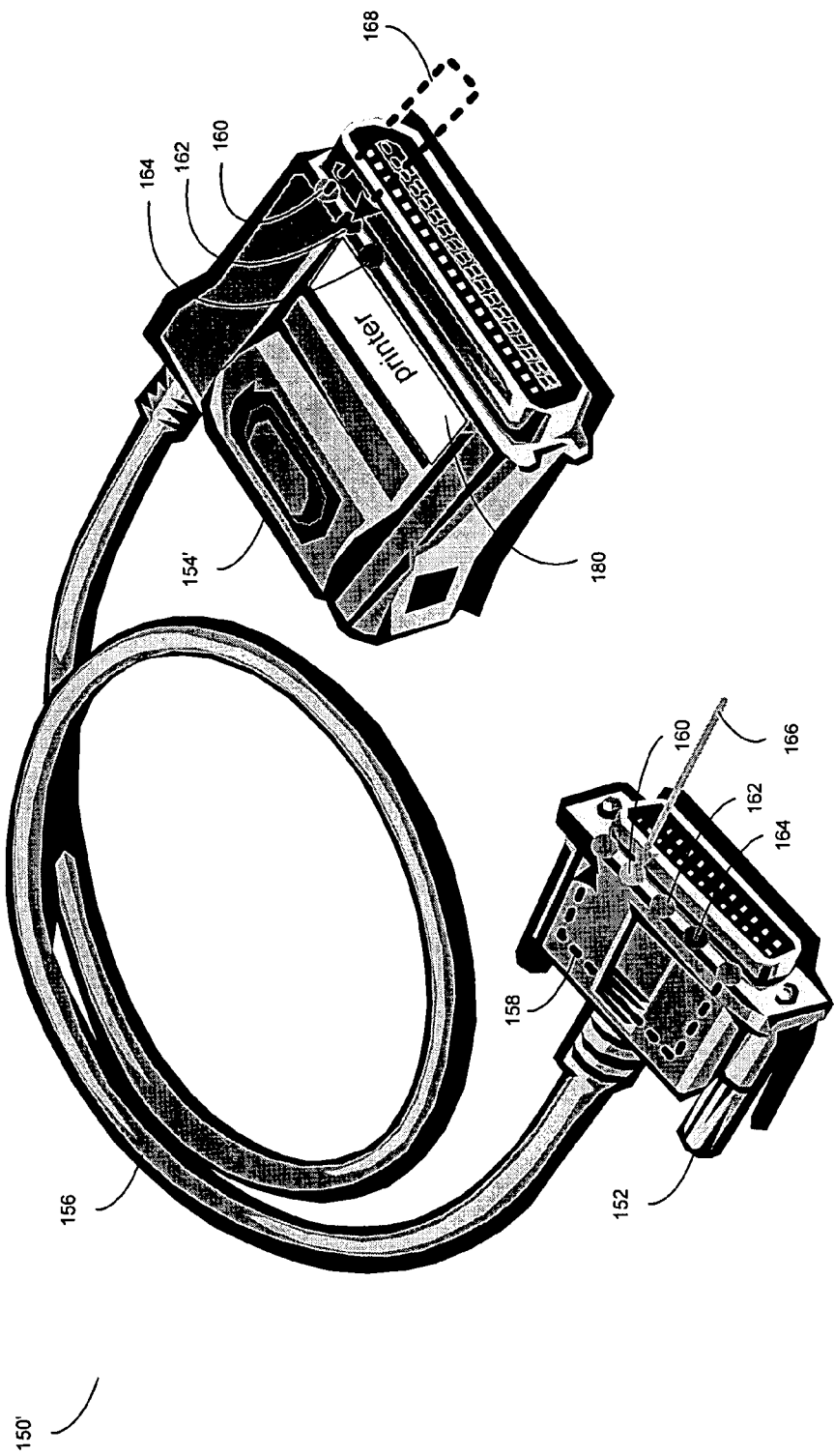
FIG. 7 is a diagrammatic view of another cable assembly including the optical interface identification system of FIG. 1 and an optical indicator assembly.

Referring also to FIG. 7, there is shown an alternative embodiment cable assembly 150' (similar to that of cable assembly 150) that includes a pair of connector assemblies 152, 154' and a conductor assembly 156. In this illustrated embodiment, connector assembly 154' includes an optical indicator assembly 180 for indicating the connection type and/or connection characteristic of connector assembly 154'. Examples of optical indicator assembly 180 may include the end of a light pipe, the end of an optical fiber, or a passive display panel that is illuminated by the end of an optical fiber or the end of a light pipe.

Optical indicator assembly 180 may be configured to define the type of device to which connector assembly 154' is releasably coupled. For example, assume that when optical conductor 160 is optically coupled (via optical pathway 168) to optical conductor 162, connector assembly 154' is releasably coupled to a printer. Accordingly, optical conductor 162 may include an optical signal splitter (not shown) that directs a portion of the optical signal being returned to connector assembly 152 (via optical conductor 162) to optical indicator assembly 180. This portion of the optical signal provided to optical indicator assembly 180 may result in optical indicator assembly 180 being illuminated. As shown in FIG. 7, optical indicator assembly 180 may include text (e.g., "printer"), which is illuminated by the portion of the optical signal directed to optical indicator assembly 180. Additionally, an optical indicator assembly (not shown) may be included within connector assembly 152 and configured to direct a portion of the optical signal passing through optical pathway 158 to the optical indicator assembly, thus indicating the connection type and/or connection characteristic of connector assembly 152.

Figure 8:
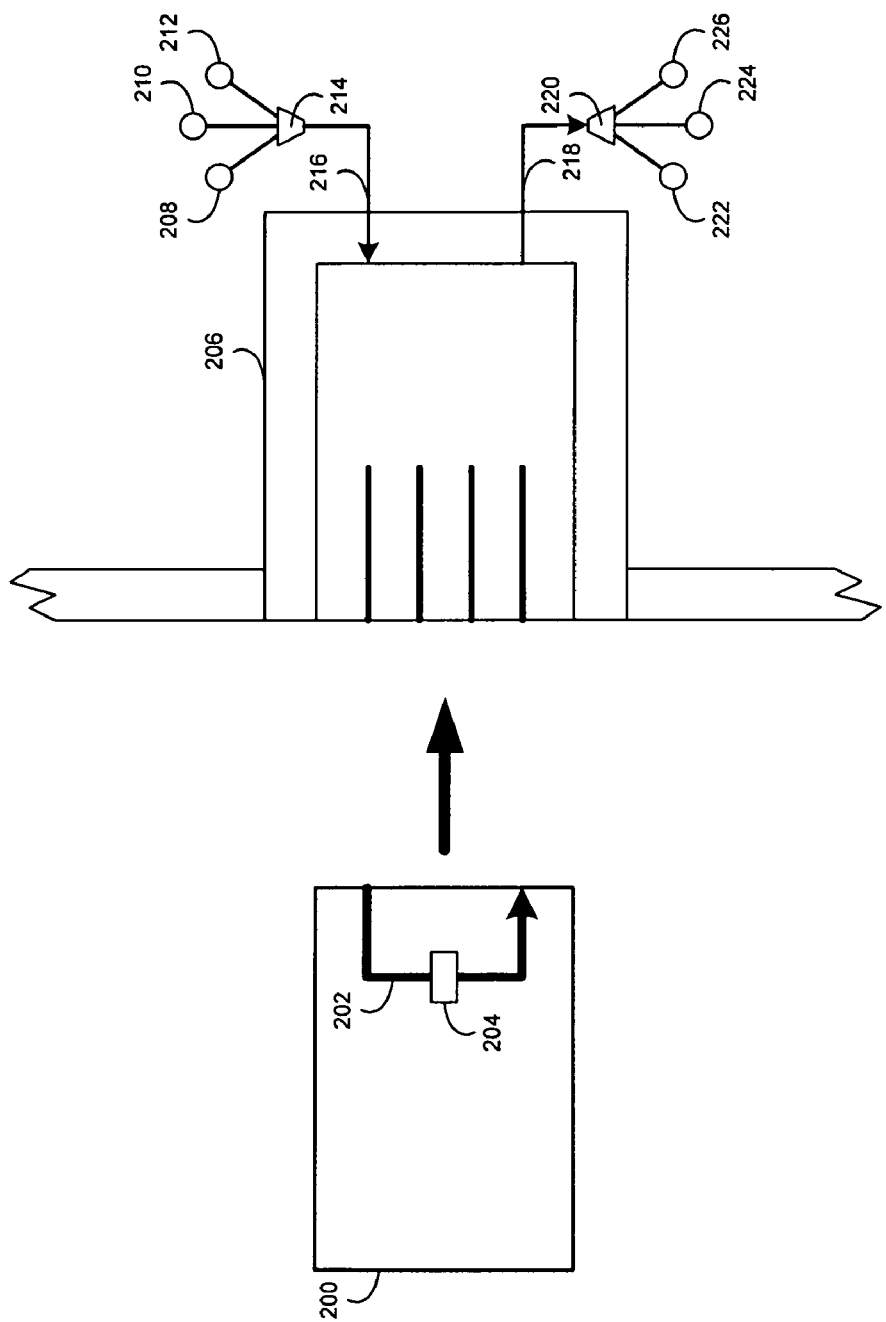
FIG. 8 is a diagrammatic view of another embodiment of the optical interface identification system of FIG. 1.

Through the use optical filtering, a single optical pathway may be used to define multiple connection types/characteristics. Referring also to FIG. 8, there is a shown a connector assembly 200 that includes an optical pathway 202 having an optical filter 204. Optical filters may be capable of selectively modifying signals in various ways, such as specific wavelength filters, polarization filters, diffraction filters, and attenuation filters, for example. Accordingly, optical filter 204 may be configured to allow a certain wavelength of light pass through the filter, while filtering out other wavelengths. For example, assume that optical filter 204 is configured to allow only blue light to pass through it, while blocking all other wavelengths of light within the optical spectrum. Alternatively, optical filter 204 may be configured to only allow infrared light to pass through it, while blocking visible and ultraviolet light.

Socket assembly 206 may include a plurality of photo emitters 208, 210, 212, each of which produces an optical signal at a different wavelength. For example, assume that photo emitter 208 produces a red optical signal, photo emitter 210 produces a blue optical signal, and photo emitter 212 produces a green optical signal. The resulting optical signals may be combined (e.g., by passive optical star technology 214) to form a composite optical signal 216. Upon receiving optical signal 216, optical filer 204 of optical pathway 202 may filter all but one of the three optical signals. For example, assume that optical filter 204 is configured to allow blue optical signals to pass, while filtering red and green optical signals. Accordingly, filtered optical signal 218 will only contain a blue optical signal (i.e., produced by photo emitter 210).

Upon receiving filtered optical signal 218, an optical signal splitter 220 may split filtered optical signal 218 into e.g., three separate optical signals, the first of which is provided to a red light photodetector 222, the second of which is provided to a blue light photo detector 224, and the third of which is provided to a green light photo detector 226. As (in this example), optical filter 204 only allows for the passage of a blue optical signal, only blue light photo detector 224 will detect a signal. Accordingly, by varying the type of optical filter included within a connector assembly, a single optical pathway may be used to define a plurality of connection types/characteristics.

As described above, the term "light" broadly refers to nominally any type of radiation, including electromagnetic (EM) radiation in or out of what is commonly considered to be the visible spectrum. This term may thus include EM radiation in the infra-red (IR) and/or ultra-violet (UV) ranges, or beyond. Further and as described above, the term "passive" refers to a construction that does not require external electric power to operate, but rather, is powered solely by light incident thereon or passing therethrough, and as may be further defined herein.

The embodiments described above demonstrate that the teachings thereof are applicable to a wide variety of plug assembly types. Examples of such plug assemblies include, but are not limited to: RJ-XX (e.g., RJ21, RJ45, RJ28, RJ11); MJ; MMJ keyed; Compu-shield™; Krone™; Dsub (e.g., D9, D15, D25, D37, D50); Hybrids; Leaf style (e.g., Centronics™, USB, PCMCIA, Infiniband/10 GigEnet); and Fiber receptacle assemblies (e.g., MTRJ, LC, SC, ST, FDDI).

While the system is described above as using a stand-alone photo emitter (e.g., photo emitter 32 of FIG. 1) and a stand-alone photo detector (e.g., photo detector 38 or 40 of FIG. 1), other configurations are possible. For example, if cable assembly 14 is a fiber optic cable assembly, the socket assemblies for use with cable assembly 14 will include photo emitters and photo detectors for use when transmitting and receiving data. Accordingly, the socket assembly may be configured to temporarily use one or more of the data photo emitters and data photo detectors to determine the connection type/characteristic concerning the socket assembly/connector assembly pair.

For example, for the first 500 milliseconds that the connection assembly is inserted into the socket assembly, one or more of the data photo emitters may generate the optical signal (e.g., optical signal 30 of FIG. 1) and one or more of the data photo detectors may detect the received optical signal (e.g., optical signals 34 or 36 of FIG. 1).

Alternatively, data may be transmitted and received in a first wavelength (e.g., blue light) and the connection type/characteristic detection process may utilize a different wavelength (e.g., red light). Accordingly, by utilizing photo detectors that are capable of processing multiple wavelengths of light (as described above), the connection type/characteristic detection process may be performed regardless of whether data is being transferred.

A number of implementations have been described. Nevertheless, it will be understood that various modifications may be made. Accordingly, other implementations are within the scope of the following claims.

What is claimed is:

1. A connector assembly, configured to releasably couple a socket assembly, comprising:
   zero or more data conductors; and
   an optical pathway, independent of the zero or more data conductors, the optical pathway configured to:
      receive an optical signal from an optical light source positioned within the socket assembly; and
      provide at least a portion of the optical signal to an optical light target positioned within the socket assembly.

2. The connector assembly of claim 1 wherein the optical light source is a photo emitter.

3. The connector assembly of claim 1 wherein the optical light target is a photo detector.

4. The connector assembly of claim 1 wherein the optical light target is an optical conductor, and wherein the optical conductor is optically-coupled to a photo detector.

5. The connector assembly of claim 1 wherein at least one of the zero or more data conductors is an electrical data conductor.

6. The connector assembly of claim 1 wherein at least one of the zero or more data conductors is an optical data conductor.

7. The connector assembly of claim 1 wherein the optical signal includes optical energy within a defined optical spectrum, the optical pathway including an optical filter for filtering a portion of the defined optical spectrum.

8. The connector assembly of claim 1 further comprising one or more additional optical pathways, wherein each additional optical pathway is configured to:
   receive the optical signal from the optical light source positioned within the socket assembly; and provide at least a portion of the optical signal to a unique optical light target positioned within the socket assembly.

9. The connector assembly of claim 1 wherein the optical pathway includes at least one fiber-optic conductor.

10. The connector assembly of claim 1 wherein the optical pathway includes at least one optical reflector.

11. The connector assembly of claim 1 further comprising:
an optical indicator assembly;
wherein the optical pathway is further configured to provide at least a portion of the optical signal to the optical indicator assembly; and
wherein the optical indicator assembly is configured to provide a visual indicator concerning a characteristic of the coupling of the socket assembly and the connector assembly in response to receiving the at least a portion of the optical signal.

12. A cable assembly comprising:
a conductor assembly including zero or more data conductors;
a first connector assembly affixed to a first distal end of the conductor assembly and configured to releasably couple a first socket assembly;
a second connector assembly affixed to a second distal end of the conductor assembly and configured to releasably couple a second socket assembly; and
a first optical pathway, independent of the zero or more data conductors, the first optical pathway configured to:
receive a first optical signal from a first optical light source positioned within the first socket assembly; and
provide at least a portion of the first optical signal to a first optical light target positioned within the first socket assembly.

13. The cable assembly of claim 12 wherein the first optical pathway includes:
a first optical conductor positioned within the conductor assembly and configured to provide at least a portion of the first optical signal from the first connector assembly to the second connector assembly.

14. The cable assembly of claim 13 wherein the first optical pathway includes:
a second optical conductor positioned within the conductor assembly and configured to provide at least a portion of the first optical signal, provided by the first optical conductor to the second connector assembly, from the second connector assembly to the first connector assembly.

15. The cable assembly of claim 12 further comprising:
a second optical pathway, independent of the zero or more data conductors, the second optical pathway configured to:
receive a second optical signal from a second optical light source positioned within the second socket assembly; and
provide at least a portion of the second optical signal to a second optical light target positioned within the second socket assembly.

16. The cable assembly of claim 12 wherein the first optical light source is a photo emitter.

17. The cable assembly of claim 12 wherein the first optical light target is a photo detector.

18. The cable assembly of claim 12 wherein the first optical light target is an optical conductor, and wherein the optical conductor is optically-coupled to a photo detector.

19. The cable assembly of claim 12 wherein the first optical signal includes optical energy within a defined optical spectrum, the first optical pathway including an optical filter for filtering a portion of the defined optical spectrum.

20. The cable assembly of claim 12 wherein the first optical pathway includes at least one fiber-optic conductor.

21. The cable assembly of claim 12 wherein the first optical pathway includes at least one optical reflector.

22. The cable assembly of claim 12 further comprising:
an optical indicator assembly;
wherein the first optical pathway is further configured to provide at least a portion of the first optical signal to the optical indicator assembly.

23. The cable assembly of claim 22 wherein the optical indicator assembly is incorporated into the first connector assembly and is configured to provide a visual indicator concerning a characteristic of the coupling of the first socket assembly and the first connector assembly in response to receiving the at least a portion of the first optical signal.

24. The cable assembly of claim 22 wherein the optical indicator assembly is incorporated into the second connector assembly and is configured to provide a visual indicator concerning a characteristic of the coupling of the second socket assembly and the second connector assembly in response to receiving the at least a portion of the first optical signal.

* * * * *